(12) United States Patent
Hsieh

(10) Patent No.: US 8,092,026 B2
(45) Date of Patent: Jan. 10, 2012

(54) OPTICAL ENGINE AND PROJECTOR USING SAME

(75) Inventor: Yi-Ping Hsieh, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 479 days.

(21) Appl. No.: 12/406,068

(22) Filed: Mar. 17, 2009

(65) Prior Publication Data

US 2010/0085542 A1    Apr. 8, 2010

(30) Foreign Application Priority Data

Oct. 6, 2008  (CN) .......................... 2008 1 0304736

(51) Int. Cl.
*G03B 21/00*  (2006.01)
(52) U.S. Cl. ......................................... 353/31; 362/235
(58) Field of Classification Search .................. 353/31, 353/52; 362/235, 231, 682; 359/629, 645, 359/682
See application file for complete search history.

(56) References Cited

U.S. PATENT DOCUMENTS

| 6,478,453 B2* | 11/2002 | Lammers et al. ............. 362/294 |
| 2007/0103646 A1* | 5/2007 | Young .............................. 353/52 |
| 2007/0121080 A1* | 5/2007 | Hsu et al. ........................ 353/52 |
| 2007/0132958 A1* | 6/2007 | Shanley et al. ................. 353/31 |
| 2009/0153805 A1* | 6/2009 | Li et al. ........................... 353/57 |

FOREIGN PATENT DOCUMENTS

| CN | 1873522 A | 12/2006 |
| CN | 1869806 B | 10/2010 |

* cited by examiner

*Primary Examiner* — Que T Le
*Assistant Examiner* — Jerry Brooks
(74) *Attorney, Agent, or Firm* — Altis Law Group, Inc.

(57) ABSTRACT

An optical engine includes a receiving chamber and three light source modules. Each light source module includes a positioning board, a heat dissipating plate, and a light source unit. The heat dissipating plate is sandwiched between the light source unit and the positioning board and adhered to the corresponding light source unit. The light source unit is installed on the receiving chamber. The positioning board is matched with the light source unit and installed on the receiving chamber.

16 Claims, 4 Drawing Sheets

OPTICAL ENGINE AND PROJECTOR USING SAME

BACKGROUND

1. Technical Field

Embodiments of the present disclosure relate to projectors and, particularly, to an optical engine and a projector having the same with effective heat dissipation.

2. Description of the Related Art

Due to reduction of the size of projectors, the density of generated heat in the projectors increases quickly. As a result, performance and reliability of the projectors will be influenced if heat dissipation is not effectively provided, and the service life span of the projectors may even be shortened. It is known that the optical engine is a main heat source in a projector, hence, how to discharge the heat generated from the optical engine effectively is a great challenge to designers in related fields.

Accordingly, it is desirable to provide an optical engine and a projector having the same with effective heat dissipation which can overcome the above-mentioned problem.

DETAILED DESCRIPTION

Embodiments of the disclosure will now be described in detail with references to the accompanying drawings.

Figure 1:
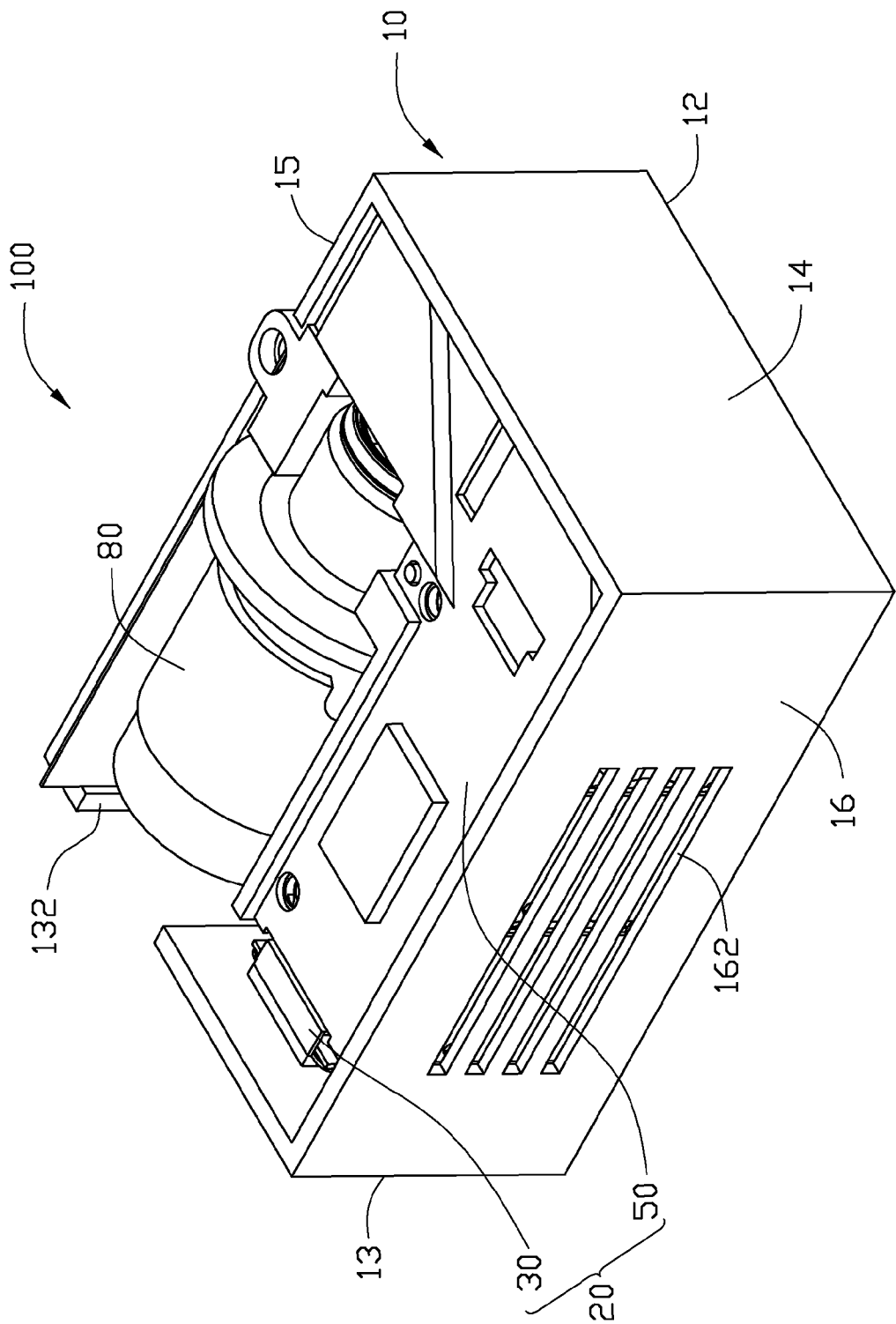
FIG. 1 is a schematic, isometric view of a projector including an optical engine, according to a first embodiment of the disclosure.

Referring to FIG. 1, a projector 100 according to one embodiment is shown. The projector 100 includes a housing 10, an optical engine 20, and a projection lens module 80. The housing 10 is configured for receiving the optical engine 20 and the projection lens module 80.

The housing 10 includes a top wall (not shown), a bottom wall 12, a front wall 13, a rear wall 14, a first sidewall 15, and a second sidewall 16. The first sidewall 15, the front wall 13, the second sidewall 16, and the rear wall 14 are connected in sequence. In the present embodiment, the front wall 13 defines a lens hole 132 adjacent to the first sidewall 15 and configured for exposing the projection lens module 80. The first sidewall 15 defines an inlet (not shown) for introducing outside air into the projector 100. The second sidewall 16 defines a grid-shaped air outlet 162 adjacent to the front wall 13 and configured for venting the heat out.

The projection lens module 80 is substantially aligned with the lens hole 132 of the front wall 13 and located between the optical engine 20 and the first sidewall 15.

The optical engine 20 includes three light source modules 30, an image forming module (not shown), and a receiving chamber 50. The light source modules 30 and the image forming module are received in the receiving chamber 50. The image forming module is configured for receiving light beams emitted from the light-source module 30 and producing images towards the projection lens module 80 which focusing the images and then projects the images onto a screen (not shown).

The imaging module may includes a set of condensing lenses, reflector, dichromic mirror, spatial light modulator, and color light combiner (not shown), which is received in the receiving chamber 50 and arranged along the path of light generated by the light source module 30 and is configured for modulating the light into optical images and directing the optical images to the minification end of the projection lens module 80.

Figure 2:
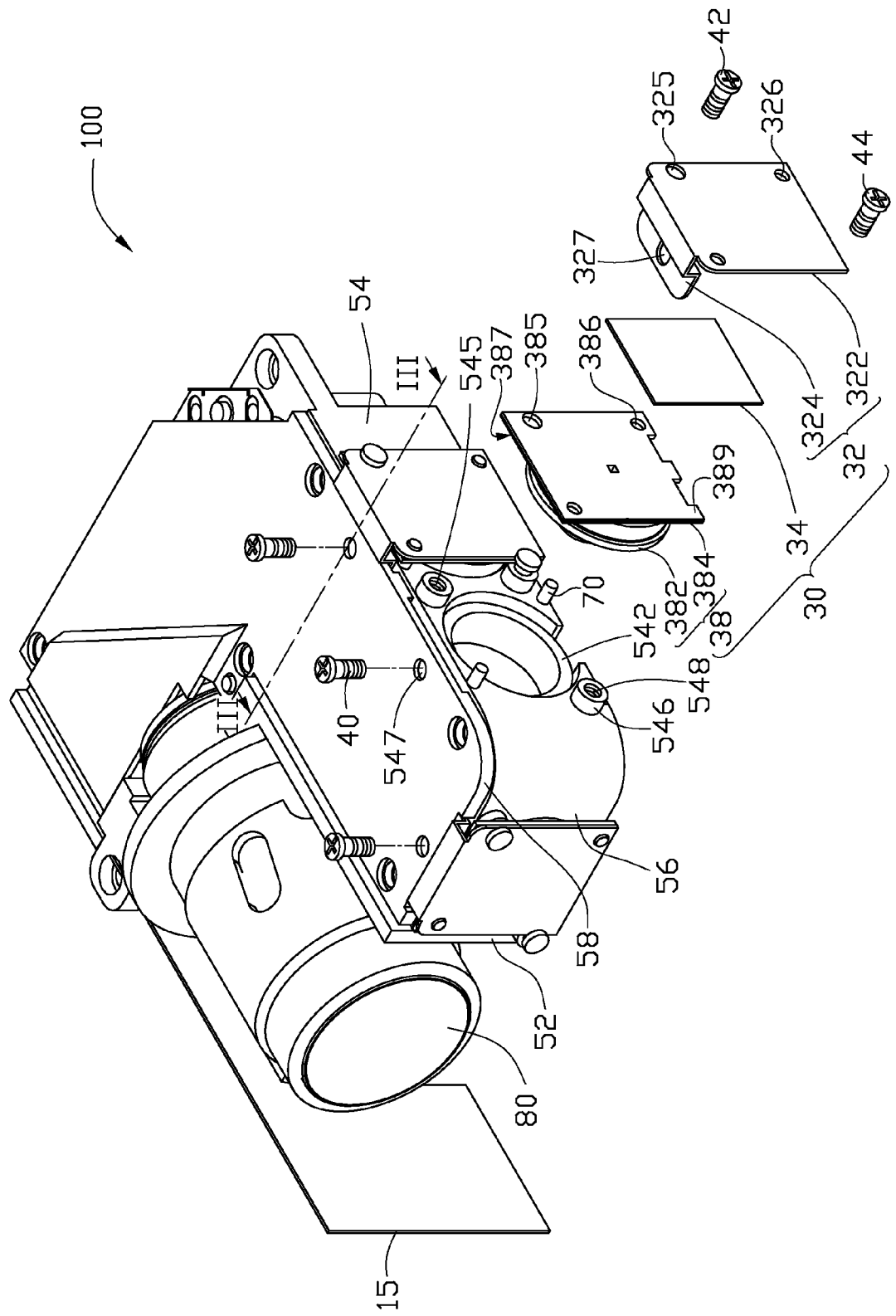
FIG. 2 is a partially exploded view of the projector of FIG. 1, viewed from another angle.
Figure 3:
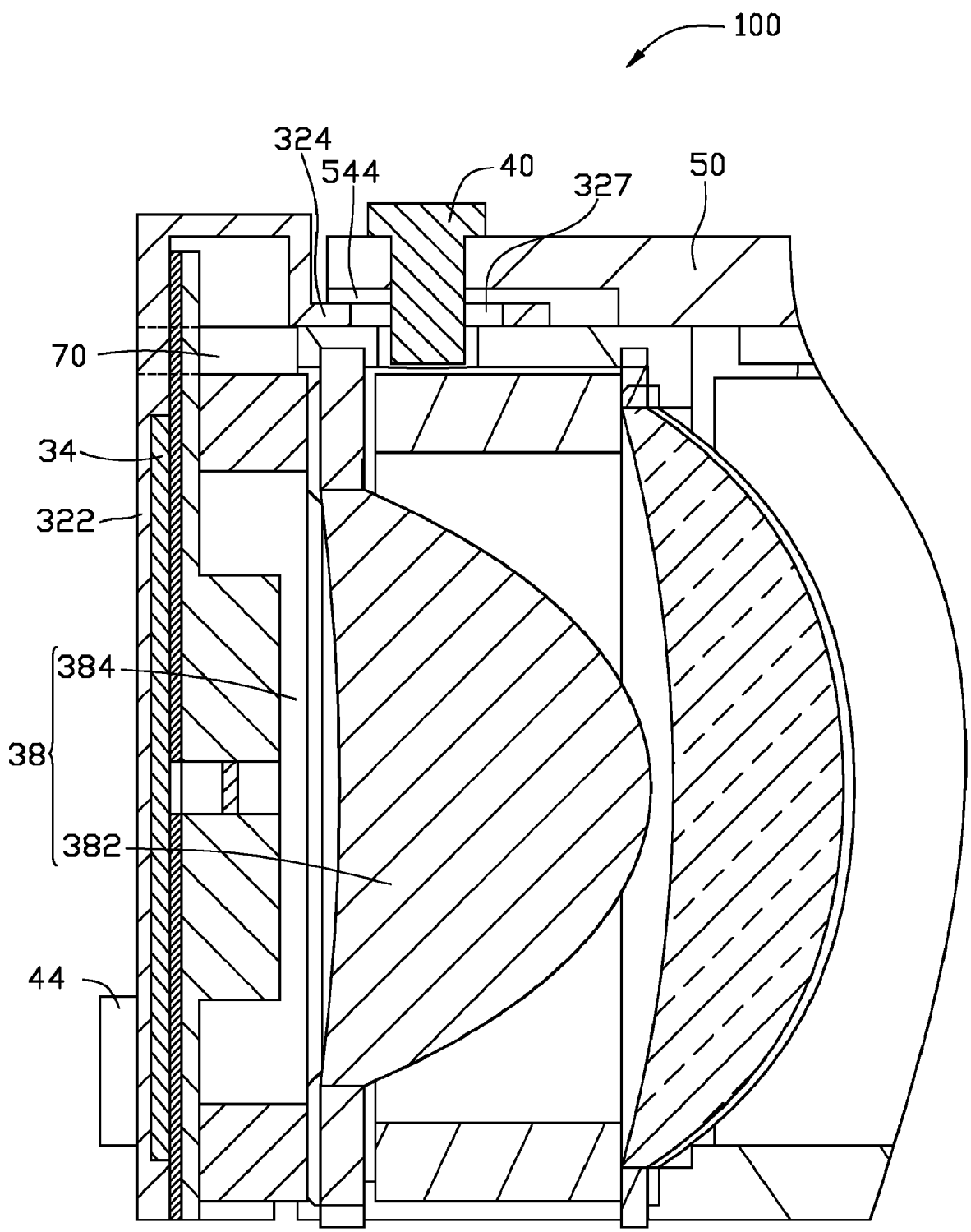
FIG. 3 is a cross-sectional view of the optical engine of FIG. 2 taken along the line III-III.

Referring to FIG. 2, each light source module 30 includes a positioning board 32, a heat dissipating plate 34, and a light source unit 38. The heat dissipating plate 34 is sandwiched between the light source unit 38 and the positioning board 32 (See FIG. 3). Each heat dissipating plate 34 is stuck with a corresponding light source unit 38 and configured for diffusing the heat generated by the light source unit 38. In the embodiment, the heat dissipating plate 34 is rectangular. The positioning board 32 and the light source unit 38 are installed on the receiving chamber 50. The positioning boards 32 are made of metal, such as copper, or a composite material having thermal conductivity, such as ethoxyline resin.

The positioning board 32 includes a main body 322 and a positioning portion 324. The positioning portion 324 extends from an end of the main body 322 along a direction substantially perpendicular to the main body 322. In the embodiment, the main body 322 of the positioning board 32 is rectangular. A first through hole 325 is defined on a diagonal of the main body 322 and arranged at a corner of the main body 322. Two first latching holes 326 are defined on the other diagonal of the main body 322. A first screw hole 327 is defined in the positioning portion 324.

Each light source unit 38 includes a light source 382, and a driving circuit board 384. The driving circuit board 384 is electrically connected to the light source 382 and configured for driving the light source 382 to emit light. In the embodiment, the driving board 384 is rectangular. The light source 382 is an LED lamp. The driving circuit board 384 includes a first surface 387 and an opposite second surface 389. The light source 382 is directly disposed on the first surface 387 of the driving circuit board 384. The heat dissipating plate 34 is adhered to a second surface 389 of the driving circuit board 384. A second through hole 385 is defined at a corner of the driving circuit board 384 corresponding to the first through hole 325. Two second latching holes 386 are defined at two corners of the driving circuit board 384 corresponding to the first latching holes 326.

In the embodiment, the size of the dissipating plate 34 is smaller than those of the driving board 384 and the main body 322 of the positioning board 32 so that an attachment can be inserted into the first and second through holes 325 and 385 to install the driving board 384 and the main body 322 of the positioning board 32 to the receiving chamber 50. It is to be understood that, when the size of the dissipating plate 34 is substantially equal to those of the driving board 384 and the main body 322 of the positioning board 32, the dissipating plate 34 is required to define four through holes or four cutouts at the four corners thereof corresponding to the first and second through holes 325 and 385, and first and second latching holes 326 and 386.

The length of the heat dissipating plate 34 can be larger than that of the driving board 384 and the width of the heat dissipating plate 34 is smaller than that of the driving board for the attachment inserting into the first and second through holes 325 and 385. Alternatively, the length of the heat dissipating plate 34 can be smaller than that of the driving board 384 and the width of the heat dissipating plate 34 is larger than that of the driving board for the attachment inserting into the first and second through holes 325 and 385.

The receiving chamber 50 is substantially cuboid and includes a first sidewall 52 adjacent to the projection lens module 80, an opposite second sidewall 54 away from the projection lens, an end wall 56 connecting the first and second sidewalls 52 and 54, and a top surface 58 connecting to the end wall 56, and the first and second sidewalls 52 and 54. The first and the second sidewalls 52 and 54 are substantially parallel to the first sidewall 15 of the housing 10. The end wall 56 is substantially perpendicular to the first sidewall 15 of the housing 10. The top surface 58 is substantially perpendicular to the first sidewall 15 of the housing 10. In the embodiment, the end wall 56 is integrally formed with the first and second sidewalls 52 and 54. The receiving chamber 50 may be made of metal, such as gold, copper, or a composite material having thermal conductivity, such as ethoxyline resin.

In the embodiment, three light sources 382 are arranged in an approximately L-shaped configuration. Two light sources 382 are installed on the second sidewall 54 of the receiving chamber 50. Another light source 382 is installed on the end wall 56 of the receiving chamber 50. In the embodiment, the light sources 382 include a red light emitting diode (LED) light source, a blue LED light source, and a green LED light source. Also, the light sources 382 can be arranged in other compact arrangements.

Three receiving holes 542 are defined on the second sidewall 54 and the end wall 56 of the receiving chamber 50 respectively and configured for receiving the corresponding light sources 382. The size of each receiving hole 542 is substantially equal to that of each light source 382. It is to be understood that if the light sources are linearly arranged, the three receiving holes 542 are all defined on a same wall of the receiving chamber 50.

A recess 544 is defined on the top surface 58 of the receiving chamber 50 and configured for permitting the positioning portion 324 of the positioning board 32 extending into the receiving chamber 50 therethrough. A second screw hole 547 is defined on the top surface 58 corresponding to the first screw hole 327 of the positioning portion 324. The positioning portion 324 of positioning board 32 is positioned on the receiving chamber 50 by inserting the positioning portion 324 into the receiving chamber 50 via the recess 544 and secured by a first bolt 40 inserted through the corresponding the first and second screw holes 327 and 547.

A third screw hole 545 is defined in the second sidewall 54 of the receiving chamber 50 corresponding to the first and second through holes 325 and 385. The main body 322 of positioning board 32 is secured to the second sidewall 54 of the receiving chamber 50 via a second bolt 42 inserted through the corresponding first and second through holes 325 and 385, and the third screw hole 545.

It is to be noted that although the first and second through holes 325 and 385, and the corresponding third screw hole 545 are exemplarily illustrated herein, less or more first and second through holes and screw holes may be optionally adopted in the present projector in other alternative embodiments by those of ordinary skill in the art and be within the scope thereof. For example, two first through holes 325 can be disposed on a diagonal of the main body 322 of the positioning board 32, and two second through holes 385 disposed on the driving board 384 corresponding to two first through holes 325, and two corresponding third screw holes 545 disposed on the second sidewall 54 of the receiving chamber 50. Two second bolts 42 match the corresponding first and second through holes 325 and 385, and the second screw hole 546 for positioning the main body 322 of the positioning board 32.

In the embodiment, a screw holder 546 is disposed on the second sidewall 54 of the receiving chamber 50, a positioning screw hole 548 is defined in the screw holder 546, when the positioning board 32 is installed on the second sidewall 54 of the receiving chamber 50, the main body 322 of the positioning board 32 is covered the screw holder 546 partly, a third bolt 44 is matched with the positioning screw hole 548 for pressing the main body 322 of the positioning board 32 to make the main body 322 fix between the third bolt 44 and the screw holder 546. In the embodiment, two light source modules 30 are installed on the second sidewall 54 of the receiving chamber 50, and secured by the third bolt 44 being installed in the positioning screw hole 548 defined between the two light source module 30 to press the main bodies 322 of the two positioning boards 32.

In order to allow convenient assemble of the positioning board 32, two positioning posts 70 are disposed on the second sidewall 54 of the receiving chamber 50 corresponding to the first and second latching holes 326 and 386. The positioning posts 70 are installed in the first and the second latching holes 326 and 386 for positioning the positioning board 32 on the second sidewall 54 of the receiving chamber 50.

It is to be noted that although two post 70, and two corresponding first and second latching holes 326 and 386 are exemplarily illustrated herein, less or more posts, and corresponding first and second latching holes may be optionally adopted in the present projector in other alternative embodiments by those of ordinary skill in the art and therefore be within the scope thereof.

Figure 4:
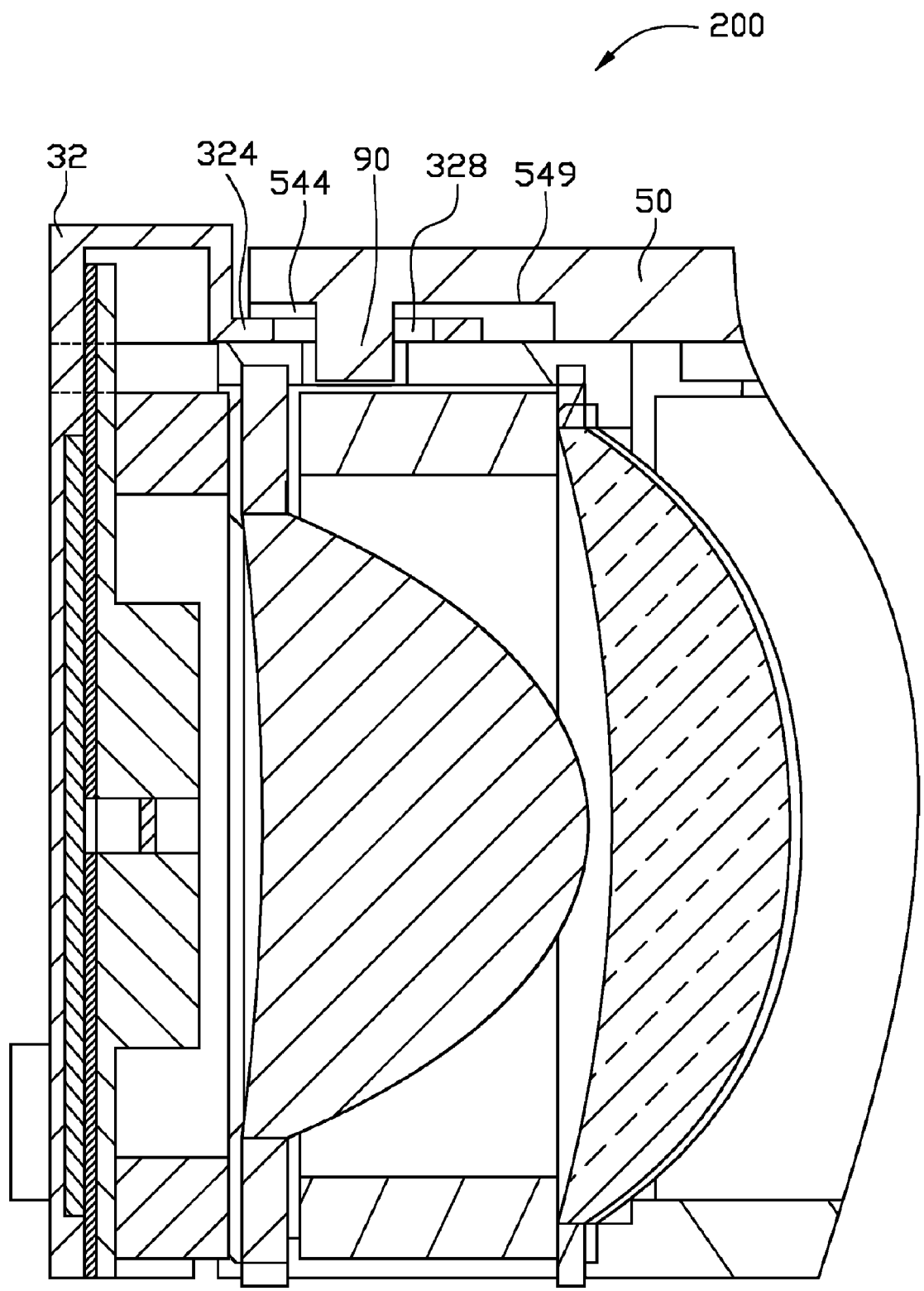
FIG. 4 is a cross-sectional view of an optical engine according to a second embodiment.

Referring to FIG. 4, a projector 200 according to a second embodiment is similar to the projector 100 of the first embodiment except that the positioning board 32 is attached to the receiving chamber 50. The recess 544 includes an inner surface 549 near the top surface 58 of the receiving chamber 50. A protruding post 90 is disposed on the inner surface 549 and extended from the inner surface 549 of the recess 544 along a direction substantially perpendicular to the inner surface 549. A latching groove 328 is defined in the positioning portion 324 of the position board 32 corresponding to the protruding post 90. The positioning portion 324 of positioning board 32 is positioned on the receiving chamber 50 by inserting the positioning portion 324 into the receiving chamber 50 via the recess 544 and secured by the protruding post 90 engaging with the latching groove 328.

The heat dissipating plate 34 and the positioning board 32 connected to the optical engine 20 can dissipate the heat generated by the corresponding light source 382 of the optical engine 20, thereby the projectors 100, 200 are compact and can operate with a minimum amount of noise.

It is to be understood, however, that even though numerous characteristics and advantages of the embodiments have been set forth in the foregoing description, together with details of the structures and functions of the embodiments, the disclosure is illustrative only, and changes may be made in detail, especially in matters of arrangement of parts within the principles of the invention to the full extent indicated by the broad general meaning of the terms in which the appended claims are expressed.

What is claimed is:

1. An optical engine comprising:
a receiving chamber comprising a first sidewall, an opposite second sidewall, an end wall connecting the first and second sidewalls, and a top wall connecting the end wall, and the first and second sidewalls; three receiving holes being defined in the second sidewall and the end wall;
three light source modules, each light source module comprising a positioning board, a heat dissipating plate, and a light source unit, the heat dissipating plate being sandwiched between the light source unit and the positioning board and adhered to the corresponding light source unit, each light source unit being installed in a corresponding receiving hole of the receiving chamber, the positioning board being matched with the light source unit and installed on the receiving chamber, each light source unit comprising a light source and a driving circuit board comprising a first surface and an opposite second surface, the light source being electrically connected to the first surface of the driving circuit board, the heat dissipating plate being adhered to the second surface of the driving circuit board, the positioning board in each light source module comprising a main body, the main body of each positioning board defining two first latching holes arranged on the diagonal of the main body, the driving circuit board of each light source unit defining two second latching holes corresponding to the first latching holes, two positioning posts being disposed on the second sidewall of the receiving chamber and adjacent to each receiving hole of the receiving chamber corresponding to the first and second latching holes, the main body being matched with the receiving chamber via the two positioning posts matched with the first and second latching holes.

2. The optical engine of claim 1, wherein the positioning board in each light source module comprises a positioning portion, the positioning portion extends from an end of the main body along a direction substantially perpendicular to the main body, the top wall of the receiving chamber defines a plurality of recesses, the positioning portion of positioning board is positioned on the receiving chamber with the positioning portion being inserted into the receiving chamber via one recess.

3. The optical engine of claim 2, wherein the positioning portion of each positioning board defines a first screw hole, the top wall of the receiving chamber defines a second screw hole corresponding to the first screw hole, the positioning portion of positioning board is secured by a first bolt inserted through the corresponding the first and second screw holes.

4. The optical engine of claim 2, wherein each recess comprises an inner surface near the top wall of the receiving chamber, a protruding post is disposed on the inner surface and extended from the inner surface of the recess along a direction substantially perpendicular to the inner surface, a latching groove is defined in the positioning portion of the position board corresponding to the protruding post, the positioning portion of positioning board is secured by the protruding post latched with the latching groove.

5. The optical engine of claim 1, wherein a first through holes is defined on a diagonal of the main body and arranged at a corner of the main body of each positioning board, a second through hole is defined in the driving board of each light source unit corresponding to the first through hole, a third screw hole is defined adjacent to each receiving hole of the receiving chamber corresponding to the first and second through holes, the main body of the positioning board is secured to the receiving hole of the receiving chamber via a second bolt inserted through the corresponding first and second through holes, and the third screw hole.

6. The optical engine of claim 1, wherein a screw holder is disposed adjacent to each receiving hole of the receiving chamber, a positioning screw hole is defined in the screw holder, the main body of each positioning board covers the screw holder partly, a third bolt is matched with the positioning screw hole for pressing the main body of the positioning board.

7. The optical engine of claim 1, wherein the receiving chamber and the positioning board are made of metal.

8. The optical engine of claim 1, wherein the receiving chamber and the positioning board are made of a composite material having thermal conductivity.

9. A projector comprising:
a housing comprising a bottom wall, a front wall, a rear wall, a first sidewall, and a second sidewall, the front wall defining a lens hole adjacent to the first sidewall;
an optical engine received in the housing and configured for producing an image comprising:
a receiving chamber;
three light source modules, each light source module comprising a positioning board, a heat dissipating plate, and a light source unit, the heat dissipating plate being sandwiched between the light source unit and the positioning board and adhered to the corresponding light source unit, the light source unit being installed on the receiving chamber, the positioning board being matched with the light source unit and installed on the receiving chamber;
a projection lens module received in the lens hole of the housing and configured for focusing the images produced by the optical engine; wherein
the receiving chamber comprises a first sidewall adjacent to the projection lens module, an opposite second sidewall away from the projection lens module, an end wall connecting the first and second sidewalls, and a top wall connecting the end wall, and the first and second sidewalls, the first and the second sidewalls being substantially parallel to the first sidewall of the housing, the end wall being substantially parallel to the front sidewall of the housing, the top surface being substantially perpendicular to the first sidewall of the housing.

10. The projector of claim 9, wherein each light source unit comprises a light source and a driving circuit board comprising a first surface and an opposite second surface, the light source is electrically connected to the first surface of the driving circuit board, the heat dissipating plat is stuck with the second surface of the driving circuit board.

11. The projector of claim 10, wherein three receiving holes are defined in the second sidewall and the end wall for receiving the three light source modules.

12. The projector of claim 11, wherein the positioning board in each light source module comprises a main body and a positioning portion, the positioning portion extends from an end of the main body along a direction substantially perpendicular to the main body, the top wall of the receiving chamber defines a plurality of recesses, the positioning portion of positioning board is positioned on the receiving chamber with the positioning portion being inserted into the receiving chamber via one recess.

13. The projector of claim 12, wherein the positioning portion of each positioning board defines a first screw hole, the top wall of the receiving chamber defines a second screw hole corresponding to the first screw hole, the positioning portion of positioning board is secured by a first bolt inserted through the corresponding the first and second screw holes.

14. The projector of claim 12, wherein each recess comprises an inner surface near the top wall of the receiving chamber, a protruding post being disposed on the inner surface and extended from the inner surface of the recess along a direction substantially perpendicular to the inner surface, a latching groove being defined in the positioning portion of the position board corresponding to the protruding post, the positioning portion of positioning board being secured by the protruding post latched with the latching groove.

15. The projector of claim 9, wherein the receiving chamber and the positioning board are made of a composite material having thermal conductivity.

16. A projector comprising:
a housing;
an optical engine received in the housing and configured for producing an image comprising:
   a receiving chamber comprising a first sidewall, an opposite second sidewall, an end wall connecting the first and second sidewalls, and a top wall connecting the end wall, and the first and second sidewalls; three receiving holes being defined in the second sidewall and the end wall;
   three light source modules, each light source module comprising a positioning board, a heat dissipating plate, and a light source unit, the heat dissipating plate being sandwiched between the light source unit and the positioning board and adhered to the corresponding light source unit, each light source unit being installed in a corresponding receiving hole of the receiving chamber, the positioning board being matched with the light source unit and installed on the receiving chamber, each light source unit comprising a light source and a driving circuit board comprising a first surface and an opposite second surface, the light source being electrically connected to the first surface of the driving circuit board, the heat dissipating plate being adhered to the second surface of the driving circuit board, the positioning board in each light source module comprising a main body, the main body of each positioning board defining two first latching holes arranged on the diagonal of the main body, the driving circuit board of each light source unit defining two second latching holes corresponding to the first latching holes, two positioning posts being disposed on the second sidewall of the receiving chamber and adjacent to each receiving hole of the receiving chamber corresponding to the first and second latching holes, the main body being matched with the receiving chamber via the two positioning posts matched with the first and second latching holes; and
a projection lens module received in the housing and configured for focusing the images produced by the optical engine.

* * * * *